US 12,402,994 B2

(12) United States Patent
Stojakovic

(10) Patent No.: US 12,402,994 B2
(45) Date of Patent: Sep. 2, 2025

(54) FLOSSING APPARATUS FOR A DENTAL BRIDGE

(71) Applicant: Petar Stojakovic, Whitestown, IN (US)

(72) Inventor: Petar Stojakovic, Whitestown, IN (US)

( * ) Notice: Subject to any disclaimer, the term of this patent is extended or adjusted under 35 U.S.C. 154(b) by 365 days.

(21) Appl. No.: 18/198,838

(22) Filed: May 17, 2023

(65) Prior Publication Data
US 2024/0382296 A1 Nov. 21, 2024

(51) Int. Cl.
*A61C 15/04* (2006.01)

(52) U.S. Cl.
CPC .................................. *A61C 15/046* (2013.01)

(58) Field of Classification Search
CPC ....... A61C 15/00; A61C 15/04; A61C 15/045; A61C 15/046; A61C 15/047; A61C 15/048; A61C 15/02; A61C 15/042; A61C 15/043
See application file for complete search history.

(56) References Cited

U.S. PATENT DOCUMENTS

| D649,713 | S | 11/2011 | Kollar |
|---|---|---|---|
| 10,376,346 | B2 | 8/2019 | To |
| 11,179,229 | B2 | 11/2021 | Chang |
| 11,284,977 | B1 | 3/2022 | Jalbert |
| 2016/0038264 | A1 | 2/2016 | Chodorow |
| 2020/0030066 | A1 | 1/2020 | To |
| 2021/0401555 | A1 | 12/2021 | Chen |

FOREIGN PATENT DOCUMENTS

CA 2983931 9/2018

*Primary Examiner* — Rachel R Steitz
*Assistant Examiner* — Karim Asqiriba

(57) ABSTRACT

A flossing apparatus for flossing between a dental bridge and a gum of a user includes a body, an arm, and a clasp. The arm and the clasp are coupled to and extend away from the body in a same direction. The arm and the clasp are also spaced across from each other. A rod is coupled to the arm, and a distal end of the rod with respect to the rod is releasably securable to the clasp. The rod is insertable between the dental bridge and the gum to floss between the dental bridge and the bum while the distal end is secured to the clasp.

11 Claims, 8 Drawing Sheets

FLOSSING APPARATUS FOR A DENTAL BRIDGE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to flossing apparatuses and more particularly pertains to a new flossing apparatus for flossing between a dental bridge and a gum of a user.

(2) Description of Related Art Including Information Disclosed Under 37 CFR 1.97 and 1.98

The prior art provides myriad flossing apparatuses which include a floss segment mounted between a pair of arms such that a handle attached to the pair of arms may be positioned to slide the floss segment between teeth to remove foreign matter from between the teeth. However, such apparatuses do not provide a structure that is capable of inserting between a dental bridge and a gum of a user without removing the dental bridge. A new apparatus may address this problem by providing a thin rod that is permanently fastened on one end and securable on another end. The rod of such an apparatus would then be able to be threaded between the dental bridge and the gum without removing the dental bridge from the user's mouth. Then the other send of the rod may be secured such that the rod is supported on both ends and may be moved along the dental bridge and the gum to remove foreign matter between the dental bridge and the gum.

BRIEF SUMMARY OF THE INVENTION

An embodiment of the disclosure meets the needs presented above by generally comprising a body and an arm which is coupled to and extends away from the body. A clasp is coupled to and extends away from the body, too. The clasp and the arm extend in a same direction, and the clasp is spaced from the arm. The clasp is movable between an open configuration and a closed configuration. A rod is coupled to and extends away from the arm. The rod is positionable in a securement position when the clasp is positioned in the closed configuration. The securement position is defined by a distal end of the rod with respect to the arm is releasably secured to the clasp. The distal end of the rod is movable away from the clasp to define a released position of the rod wherein the rod and the clasp define an opening to a space between the arm and the clasp. The rod has a width such that the rod is configured to be insertable between a dental bridge and a gum of a user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
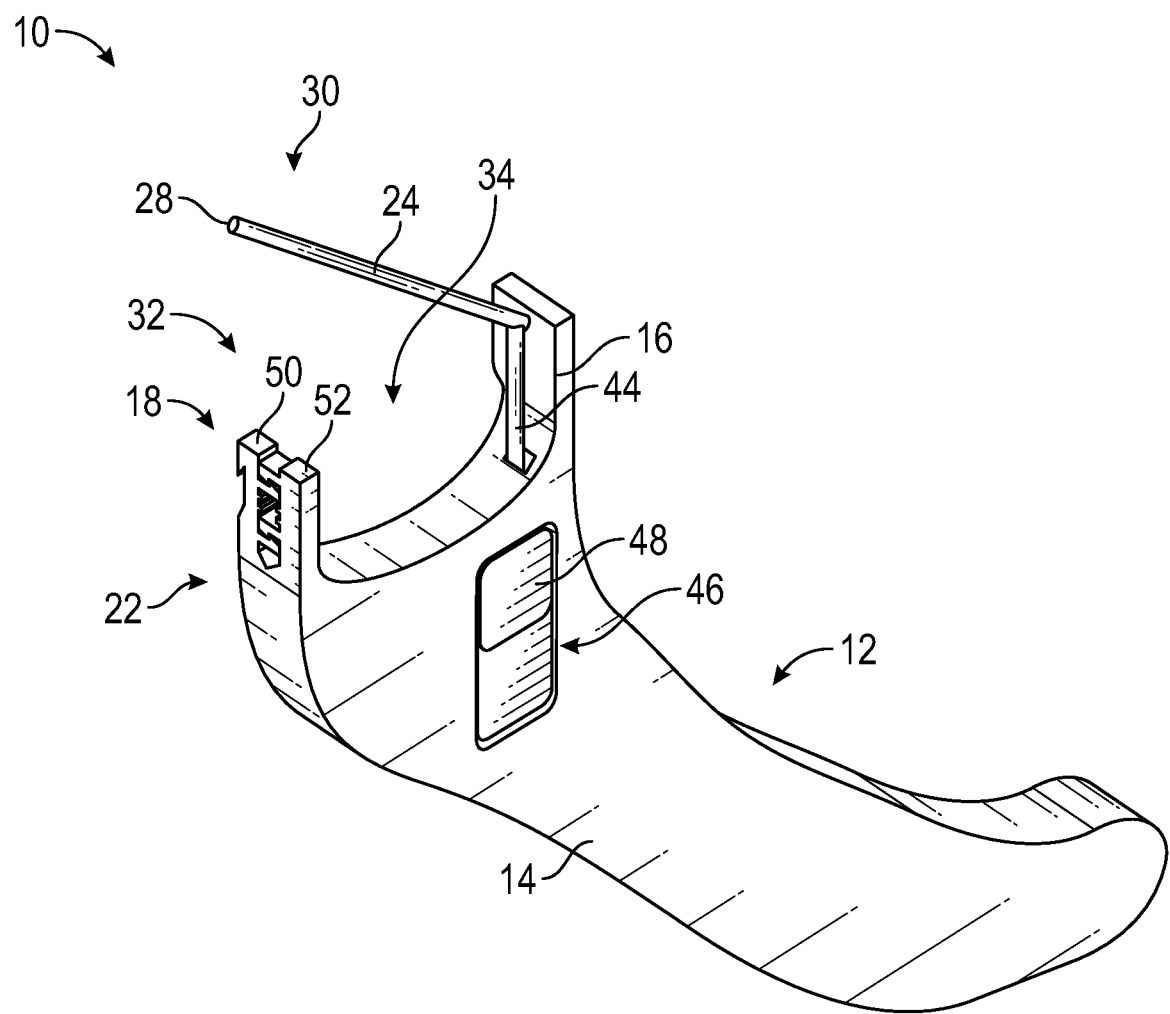
FIG. 1 is a perspective view of a flossing apparatus according to an embodiment of the disclosure.
Figure 2:
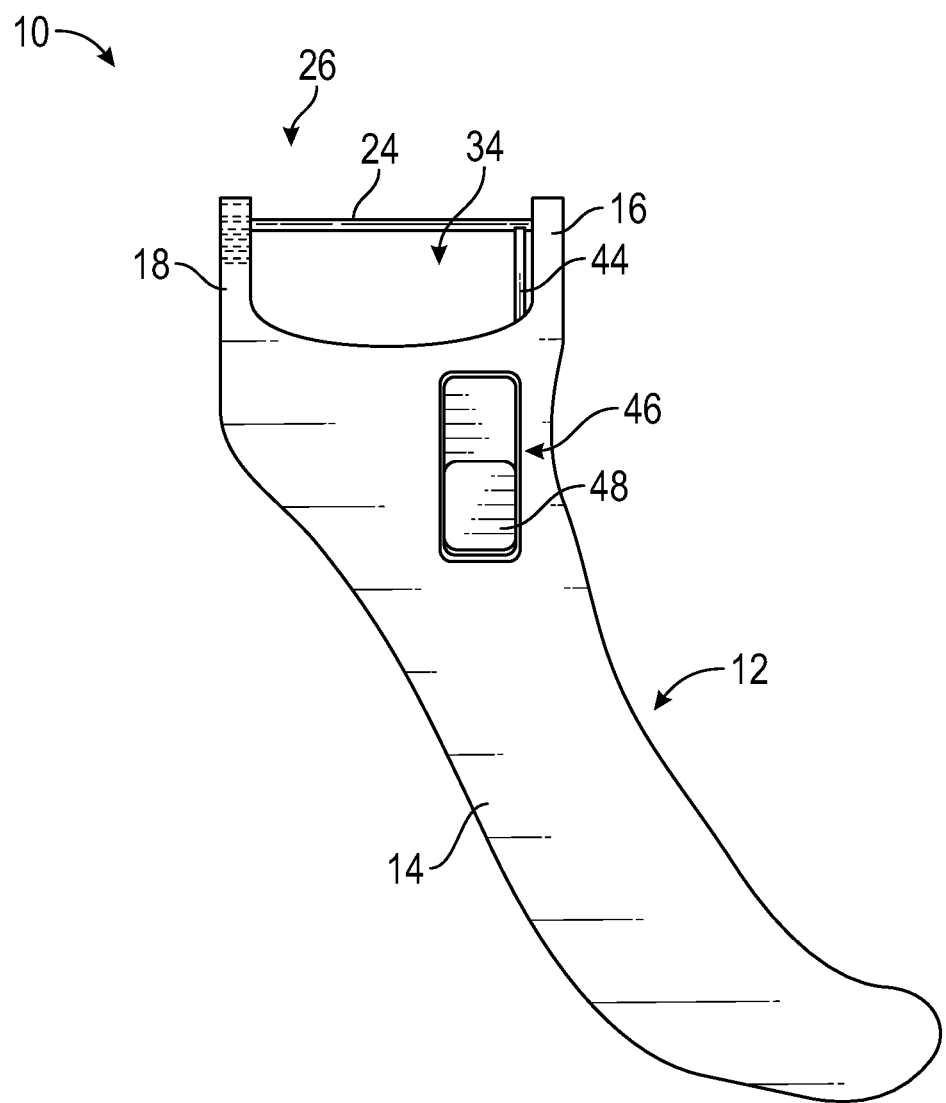
FIG. 2 is a first side view of an embodiment of the disclosure showing a rod being positioned in a securement position.
Figure 3:
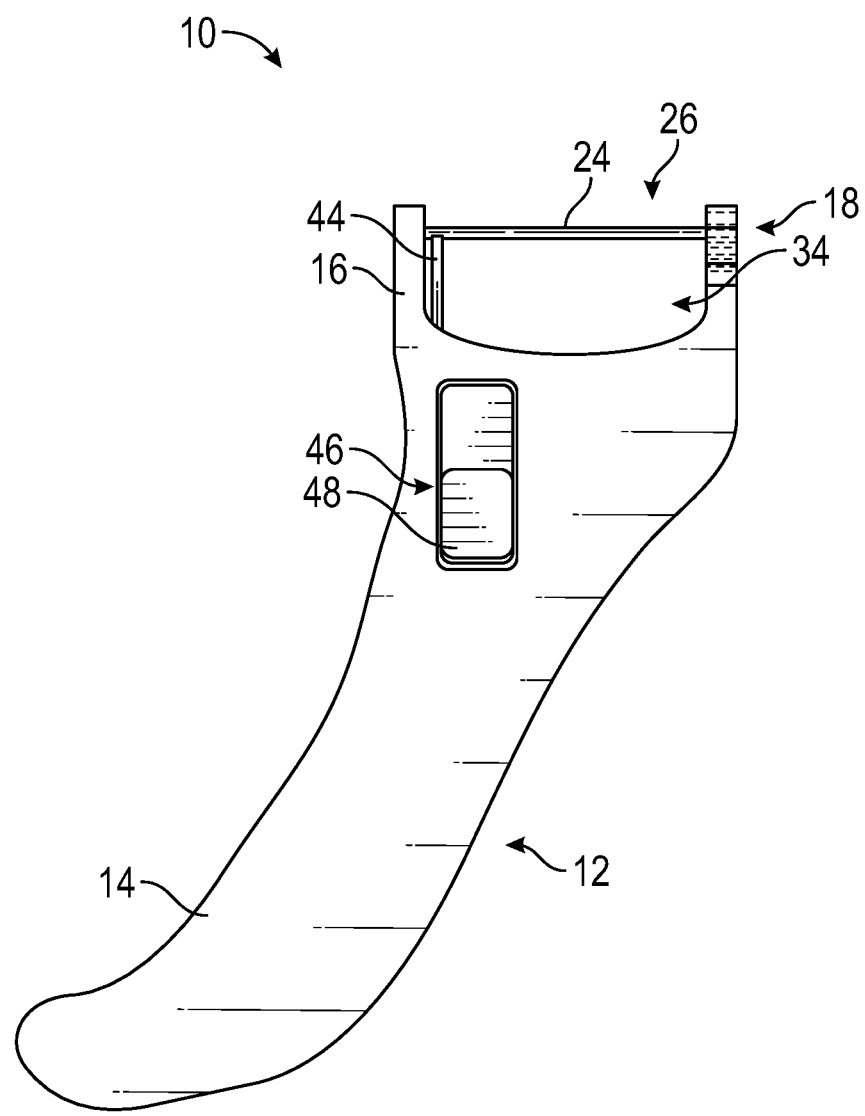
FIG. 3 is a second side view of an embodiment of the disclosure showing the rod being positioned in the securement position.
Figure 4:
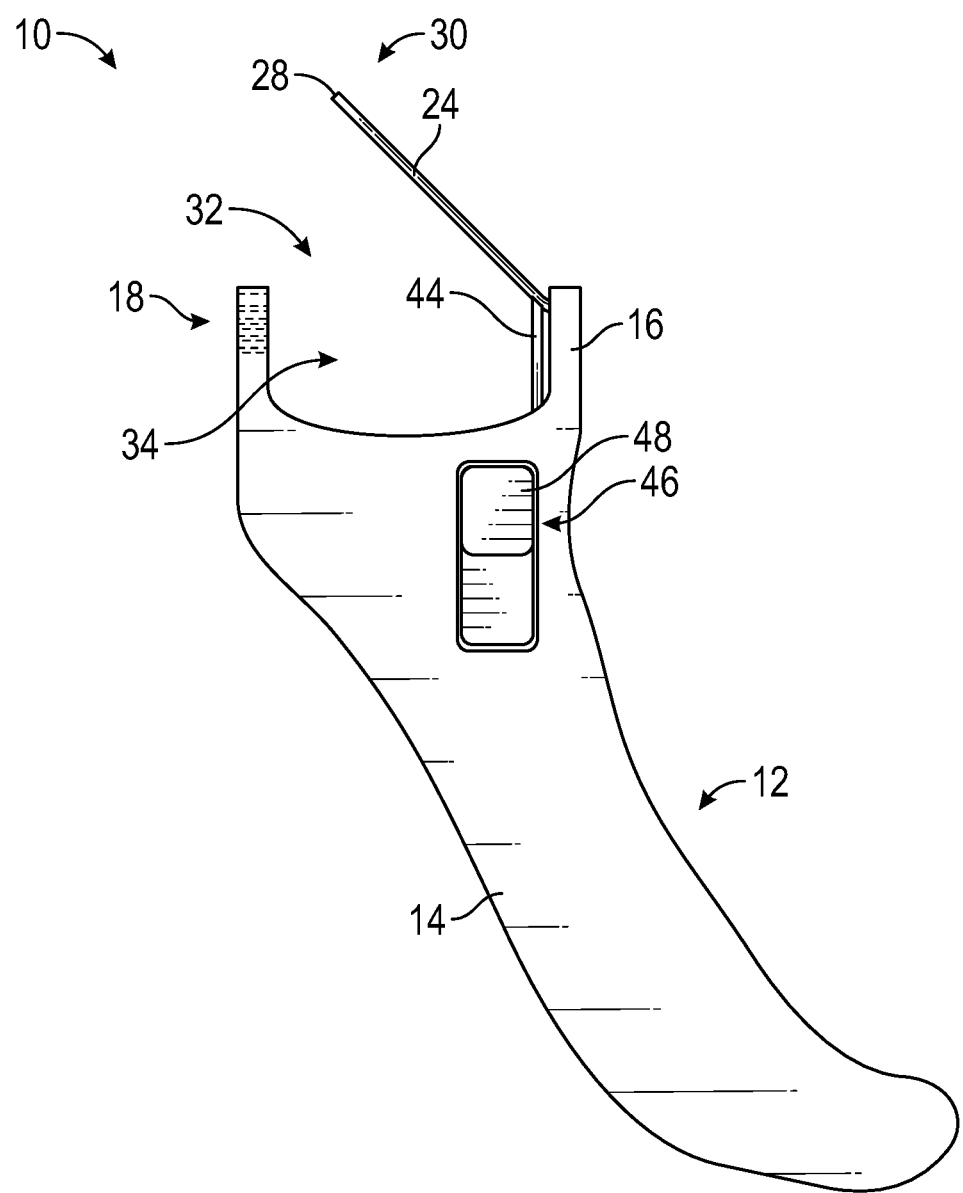
FIG. 4 is a first side view of an embodiment of the disclosure showing the rod being positioned in a released position.
Figure 5:
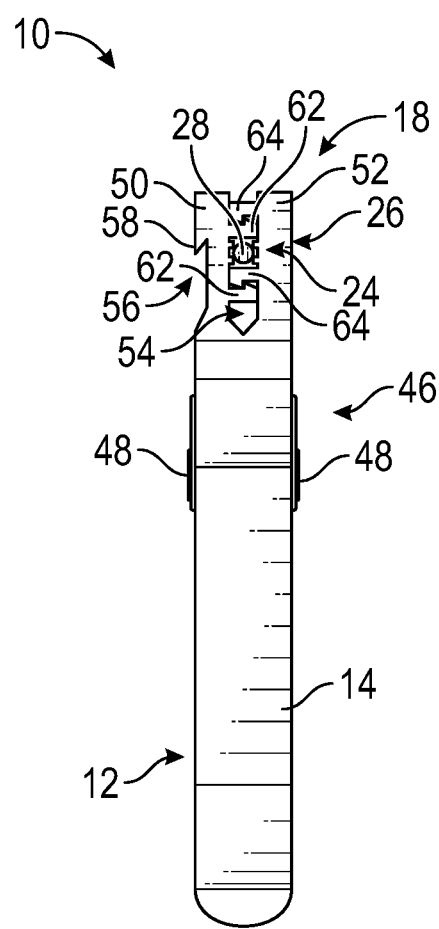
FIG. 5 is a front view of an embodiment of the disclosure showing the rod being positioned in the securement position.
Figure 6:
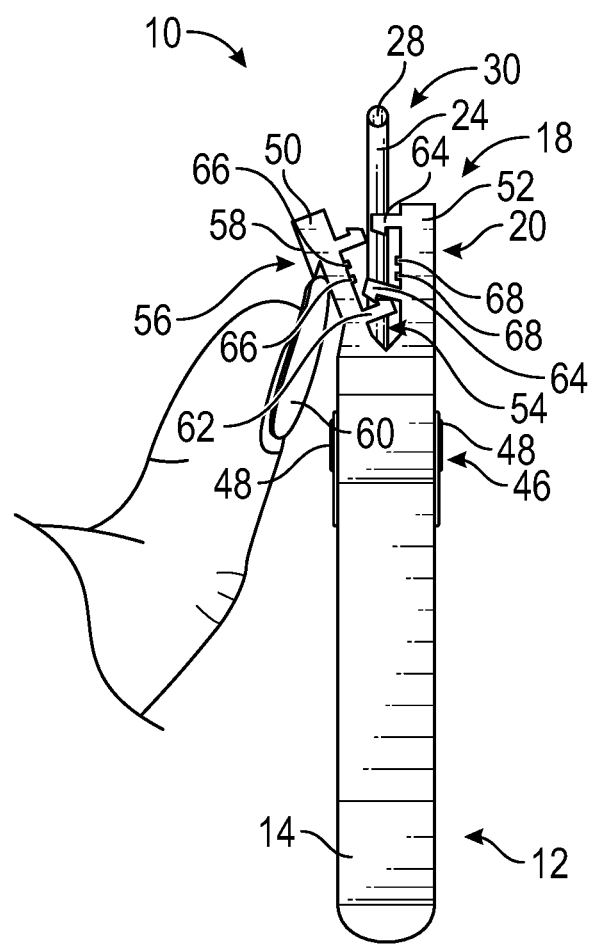
FIG. 6 is a front in-use view of an embodiment of the disclosure showing the rod being positioned in the released position.
Figure 7:
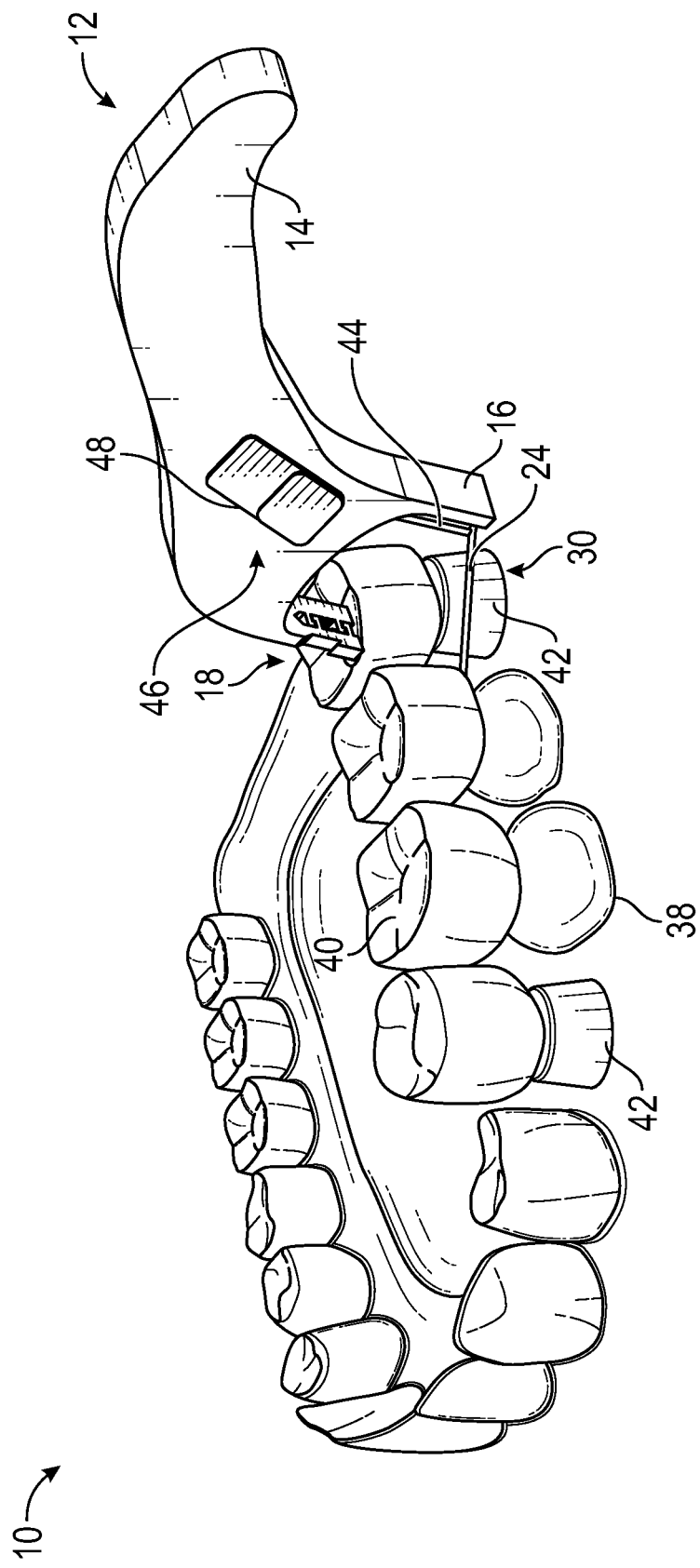
FIG. 7 is an in-use view of an embodiment of the disclosure of the rod being positioned in the released position and being threaded between a dental bridge and a gum. The dental bridge is shown exploded away from the gum.
Figure 8:
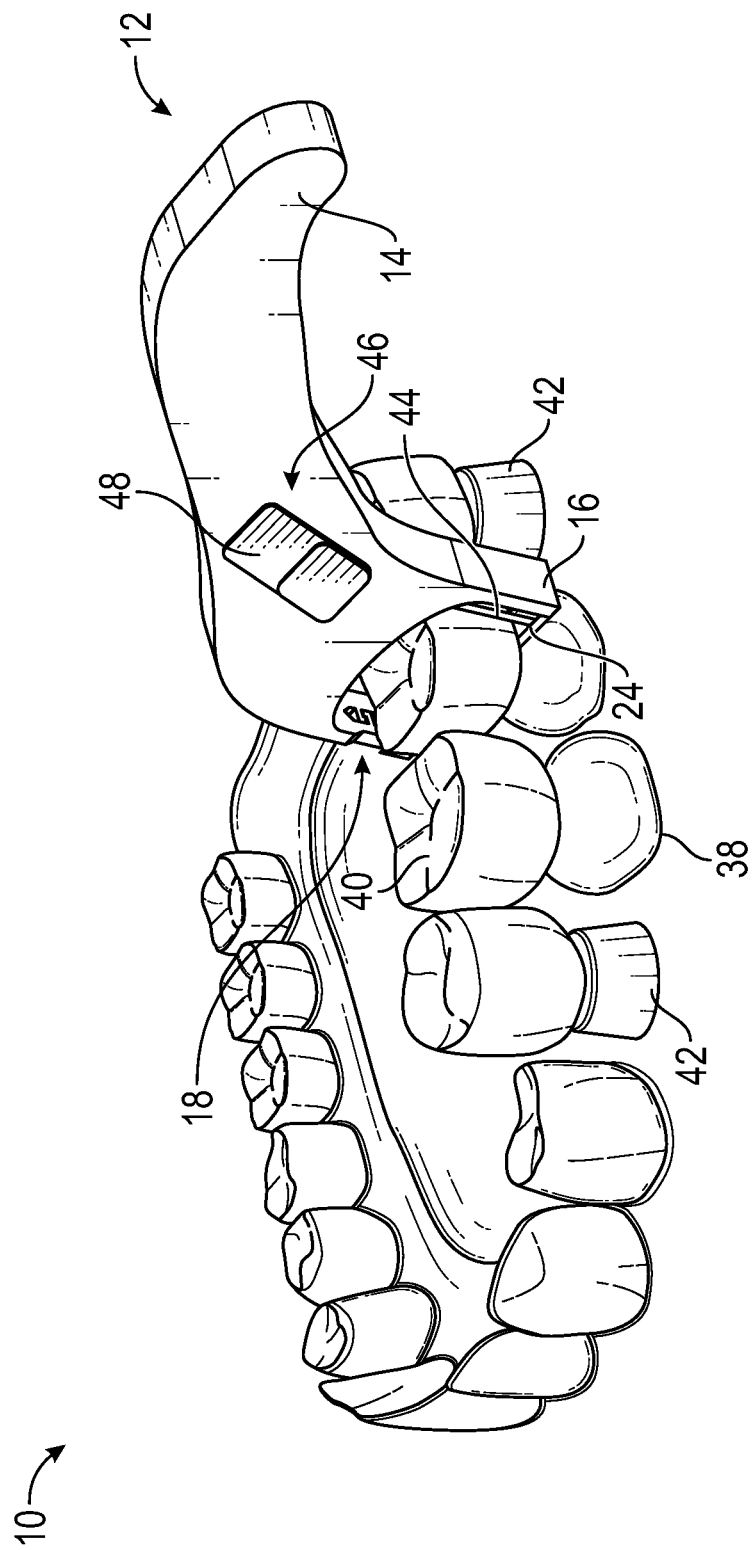
FIG. 8 is an in-use view of an embodiment of the disclosure of the rod being positioned in the securement position and extending between the dental bridge and the gum. The dental bridge is shown exploded away from the gum.

With reference now to the drawings, and in particular to FIGS. 1 through 6 thereof, a new flossing apparatus embodying the principles and concepts of an embodiment of the disclosure and generally designated by the reference numeral 10 will be described.

As best illustrated in FIGS. 1 through 6, the flossing apparatus 10 generally comprises a body 12 which is elongated and defines a handle 14. An arm 16 is coupled to and extends away from the body 12 and forms an obtuse angle with the body 12. A clasp 18 is coupled to and extends away from the body 12. The clasp 18 and the arm 16 extend in a same direction and are spaced from each other. The clasp 18 is movable between an open configuration 20 and a closed configuration 22 and is biased toward the closed configuration 22.

A rod 24 is coupled to and extends away from the arm 16. The rod 24 is positionable in a securement position 26 when the clasp 18 is positioned in the closed configuration 22. The securement position 26 is defined by a distal end 28 of the rod 24 with respect to the arm 16 being releasably secured to the clasp 18. The distal end 28 of the rod 24 is movable away from the clasp 18 to define a released position 30 of the rod 24 wherein the rod 24 and the clasp 18 define an opening 32 to a space 34 between the arm 16 and the clasp 18. The rod 24 has a width such that the rod 24 is configured to be insertable between a dental bridge 40 and a gum 38 of a user. The distal end 28 of the rod 24 is biased toward the clasp 18 and comprises a resiliently bendable material. The rod 24 is sufficiently bendable that the rod 24 is biased toward the securement position 26, but not so bendable such that the rod 24 is movable away from the securement position 26 when the clasp 18 is positioned in the closed configuration 22.

In some embodiments, the rod 24 may comprise a composite of materials, wherein only a portion of the rod 24 adjacent to the arm 16 comprises the resiliently bendable material. In other embodiments, the rod 24 may comprise only a rigid material and may be pivotally coupled to the arm 16. In such embodiments, a torsion spring or other conventional biasing member may be employed to bias said distal end 28 of said rod 24 toward said clasp 18.

An actuator 44 is coupled to the rod 24 and is movably coupled to the body 12 to move the rod 24 away from the securement position 26. The actuator 44 is positioned between the arm 16 and the clasp 18. The actuator 44 is also positioned adjacent to the arm 16 and is movable parallel to the arm 16 such that the actuator 44 does not interfere with the space 34 between the arm 16 and the clasp 18. The actuator 44 is slidably received into the body 12, and a grip 46 is coupled to the actuator 44. The grip 46 has a pair of gripping surfaces 48 facing in opposing directions away from the body 12. Each gripping surface 48 of the pair of gripping surfaces 48 is positioned between said arm 16 and said clasp 18. In some embodiments, only one gripping surface 48 is provided.

The clasp 18 comprises a first prong 50 and a second prong 52, which are coupled to and extend away from the body 12. The first prong 50 and the second prong 52 are also spaced from each other to form a groove 54 therebetween. The first prong 50 has a notch 56 extending into an outer surface 58 of the first prong 52 opposite the groove 54. The notch 56 has a size such that the notch 56 is configured for receiving a fingernail 60. The clasp 18 further comprises a pair of first engagement members 62 and a pair of second engagement members 64. each first engagement member 62 of the pair of first engagement members 62 is coupled to the first prong 50 and extends toward the second prong 52. Each second engagement member 64 of the pair of second engagement members 64 is coupled to the second prong 52 and extends toward the first prong 50. Each second engagement member 64 of the pair of second engagement members 64 engages an associated one of the pair of first engagement members 62 with a snap fit when the clasp 18 is positioned in the closed configuration 22, thereby retaining the clasp 18 in the closed configuration 22.

The first prong 50 is movable away from the second prong 52 to move the clasp 18 from the closed configuration 22 to the open configuration 20 and disengage each second engagement member 64 of the pair of second engagement members 64 from the associated first engagement member 62. The first prong 50 may be moved, for example, by the fingernail 60 entering the notch 56 of the first prong 50 and urging the first prong 50 via the fingernail 60 away from the second prong 52. The first prong 50 may be resiliently bendable so that the first prong 50 moves toward the second prong 52 when released to form the closed configuration 22. The notch 56 may also cause a portion of the first prong 50 to have a thickness less than a thickness of the second prong 52 such that the first prong 50 is adapted to bend more readily than the second prong 52.

The clasp 18 further comprises a pair of first protrusions 66 and a pair of second protrusions 68. Each first protrusion 66 of the pair of first protrusions 66 is coupled to the first prong 50 and extends toward the second prong 52, and each second protrusion 68 of the pair of second protrusions 68 is coupled to the second prong 52 and extending toward the first prong 50. The pair of first protrusions 66 and the pair of second protrusions 68 are positioned between the pair of first engagement members 62. The distal end 28 of the rod 24 is received into the groove 54 and is positioned between the pair of first engagement members 62 and the pair of second engagement members 64 when rod 24 is positioned in the securement position 26. The pair of first protrusions 66 and the pair of second protrusions 68 grip the rod 24 to prevent disengagement of the rod 24 and the clasp 18 when the rod 24 is positioned in the securement position 26.

The clasp 18 may comprise a conventional structure such as a clamp, a bolt snap, a carabiner, or a clip. In some arrangements, the rod 24 may have a snap fit directly with the clasp 18.

In use, the rod 24 is positioned in the released position 30 such that the distal end 28 of the rod 24 is free from the clasp 18. The rod 24 is inserted between the dental bridge 40 and the gum 38 of the user while the dental bridge 40 is attached to the gum 38 via one or more dental implants 42 or existing teeth. The clasp 18 is opened to the open configuration 20, and the distal end 28 of the rod 24 is moved into the groove 54 of the clasp 18. The clasp 18 is closed such that it grips the rod 24 and secures the distal end 28 of the rod 24 in the groove 54 of the clasp 18, thereby retaining the rod 24 in the securement position 26. The flossing apparatus is moved via the handle 14 to move the rod 24 against the gum 38 and the dental bridge 40 to remove foreign matter from the gum 38 and the dental bridge 40. The clasp 18 is opened, and the rod 24 is removed from between the dental bridge 40 and the gum 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A flossing apparatus for flossing between a dental bridge and a gum of a user, the apparatus comprising:
a body;
an arm being coupled to and extending away from the body;
a clasp being coupled to and extending away from the body, the clasp and the arm extending in a same direction, the clasp being spaced from the arm, the clasp being movable between an open configuration and a closed configuration; and
a rod being coupled to and extending away from the arm, the rod being positionable in a securement position when the clasp is positioned in the closed configuration, the securement position being defined by a distal end of the rod with respect to the arm being releasably secured to the clasp, the distal end of the rod being movable away from the clasp to define a released position of the rod wherein the rod and the clasp define an opening to a space between the arm and the clasp, the rod having a width such that the rod is configured to be insertable between the dental bridge and the gum of the user;
wherein the distal end of the rod is biased toward the clasp; and further comprising an actuator being coupled to the rod and being movably coupled to the body to move the rod away from the securement position, the actuator being positioned between the arm and the clasp, the actuator being positioned adjacent to the arm and being movable parallel to the arm such that the actuator does not interfere with the space between the arm and the clasp.

2. The apparatus of claim 1, wherein the body is elongated and defines a handle.

3. The apparatus of claim 2, wherein the arm forms an obtuse angle with the body.

4. The apparatus of claim 1, wherein the clasp is biased toward the closed configuration.

5. The apparatus of claim 4, wherein the rod comprises a resiliently bendable material.

6. The apparatus of claim 5, wherein the actuator is slidably received into the body.

7. The apparatus of claim 5, further comprising a grip being coupled to the actuator, the grip having a pair of gripping surfaces facing in opposing directions away from the body.

8. The apparatus of claim 7, wherein the first prong has a notch extending into an outer surface of the first prong opposite a groove, the notch having a size such that the notch is configured for receiving a fingernail.

9. The apparatus of claim 7, wherein the clasp further comprises:
a pair of first engagement members being coupled to the first prong and extending toward the second prong;
a pair of second engagement members being coupled to the second prong and extending toward the first prong, each second engagement member of the pair of second engagement members engaging an associated one of the pair of first engagement members with a snap fit when the clasp is positioned in the closed configuration, the first prong being movable away from the second prong to move the clasp from the closed configuration to the open configuration and disengage each second engagement member of the pair of second engagement members from an associated first engagement member; a pair of first protrusions being coupled to the first prong and extending toward the second prong, the pair of first protrusions being positioned between the pair of first engagement members;
a pair of second protrusions being coupled to the second prong and extending toward the first prong, the pair of second protrusions being positioned between the pair of second engagement members; and
the distal end of the rod being positioned between the pair of first engagement members and between the pair of second engagement members when the rod is positioned in the securement position, the pair of first protrusions and the pair of second protrusions gripping the rod to prevent disengagement of the rod and the clasp when the rod is positioned in the securement position.

10. The apparatus of claim 1, wherein the clasp comprises a first prong and a second prong being coupled to and extending away from the body, the first prong and the second prong being spaced from each other to form a groove therebetween, the distal end of the rod being received into the groove when rod is positioned in the securement position.

11. A flossing apparatus for flossing between a dental bridge and a gum of a user, the apparatus comprising:
a body being elongated and defining a handle;
an arm being coupled to and extending away from the body, the arm forming an obtuse angle with the body;
a clasp being coupled to and extending away from the body, the clasp and the arm extending in a same direction, the clasp being spaced from the arm, the clasp being movable between an open configuration and a closed configuration, the clasp being biased toward the closed configuration;
a rod being coupled to and extending away from the arm, the rod being positionable in a securement position when the clasp is positioned in the closed configuration, the securement position being defined by a distal end of the rod with respect to the arm being releasably secured to the clasp, the distal end of the rod being movable away from the clasp to define a released position of the rod wherein the rod and the clasp define an opening to a space between the arm and the clasp, the rod having a width such that the rod is configured to be insertable between the dental bridge and the gum of the user, the distal end of the rod being biased toward the clasp, the rod comprising a resiliently bendable material;
an actuator being coupled to the rod and being movably coupled to the body to move the rod away from the securement position, the actuator being positioned between the arm and the clasp, the actuator being positioned adjacent to the arm and being movable parallel to the arm such that the actuator does not interfere with the space between the arm and the clasp, the actuator being slidably received into the body;
a grip being coupled to the actuator, the grip having a pair of gripping surfaces facing in opposing directions away from the body; and
wherein the clasp comprises:

a first prong and a second prong being coupled to and extending away from the body, the first prong and the second prong being spaced from each other to form a groove therebetween, the first prong having a notch extending into an outer surface of the first prong opposite the groove, the notch having a size such that the notch is configured for receiving a fingernail;

a pair of first engagement members being coupled to the first prong and extending toward the second prong;

a pair of second engagement members being coupled to the second prong and extending toward the first prong, each second engagement member of the pair of second engagement members engaging an associated one of the pair of first engagement members with a snap fit when the clasp is positioned in the closed configuration, the first prong being movable away from the second prong to move the clasp from the closed configuration to the open configuration and disengage each second engagement member of the pair of second engagement members from an associated first engagement member;

a pair of first protrusions being coupled to the first prong and extending toward the second prong, the pair of first protrusions being positioned between the pair of first engagement members;

a pair of second protrusions being coupled to the second prong and extending toward the first prong, the pair of second protrusions being positioned between the pair of second engagement members; and the distal end of the rod being received into the groove when rod is positioned in the securement position, the distal end of the rod being positioned between the pair of first engagement members and between the pair of second engagement members when the rod is positioned in the securement position, the pair of first protrusions and the pair of second protrusions gripping the rod to prevent disengagement of the rod and the clasp when the rod is positioned in the securement position.

* * * * *